(12) United States Patent
Melikyan et al.

(10) Patent No.: US 10,495,815 B2
(45) Date of Patent: Dec. 3, 2019

(54) OPTICAL GRATING COUPLER WITH BACK-SIDE REFLECTOR

(71) Applicant: Alcatel-Lucent USA Inc., Murray Hill, NJ (US)

(72) Inventors: Argishti Melikyan, Matawan, NJ (US); Young-Kai Chen, Berkeley Heights, NJ (US); Po Dong, Morganville, NJ (US)

(73) Assignee: NOKIA OF AMERICA CORPORATION, Murray Hill, NJ (US)

( * ) Notice: Subject to any disclaimer, the term of this patent is extended or adjusted under 35 U.S.C. 154(b) by 0 days.

(21) Appl. No.: 15/387,936

(22) Filed: Dec. 22, 2016

(65) Prior Publication Data

US 2018/0180807 A1 Jun. 28, 2018

(51) Int. Cl.
*G02B 6/12* (2006.01)
*G02B 6/132* (2006.01)
*G02B 6/124* (2006.01)
*G02B 6/30* (2006.01)

(52) U.S. Cl.
CPC .......... *G02B 6/124* (2013.01); *G02B 6/12002* (2013.01); *G02B 6/12004* (2013.01); *G02B 6/132* (2013.01); *G02B 6/30* (2013.01); *G02B 2006/12104* (2013.01); *G02B 2006/12121* (2013.01); *G02B 2006/12142* (2013.01)

(58) Field of Classification Search
CPC .................................. G02B 6/12; G02B 6/132
USPC .......................................................... 385/14
See application file for complete search history.

(56) References Cited

U.S. PATENT DOCUMENTS

| 6,307,827 | B1 * | 10/2001 | Nishiwaki | B82Y 20/00 |
| | | | | 369/112.07 |
| 6,910,812 | B2 * | 6/2005 | Pommer | G02B 6/4201 |
| | | | | 257/200 |
| 9,057,844 | B2 | 6/2015 | Doany et al. | |
| 9,274,283 | B1 | 3/2016 | Ellis-Monaghan et al. | |
| 9,804,028 | B2 * | 10/2017 | Vukovic-Cvijin | G01J 3/433 |
| 2004/0156589 | A1 * | 8/2004 | Gunn, III | G02B 6/12004 |
| | | | | 385/37 |
| 2012/0250007 | A1 | 10/2012 | Na et al. | |

(Continued)

FOREIGN PATENT DOCUMENTS

EP 2 703 858 A1 5/2014

OTHER PUBLICATIONS

Zaoui, Wissem Sfar et al., "High-Efficient CMOS-Compatible Grating Couplers With Backside Metal Mirror", Optical Society of America, ECOC Technical Digest, Tu.1.E.2.pdf, 2012, 3 pages.

(Continued)

*Primary Examiner* — Kaveh C Kianni
(74) *Attorney, Agent, or Firm* — Mendelsohn Dunleavy, P.C.; Yuri Gruzdkov

(57) ABSTRACT

An apparatus includes a planar structure having a top surface, a bottom surface, and an edge; and an optical grating located near or at the top surface and having a regular pattern of features. The planar structure has a cavity, and a portion of the cavity is located between opposing portions of the top and bottom surfaces. The optical grating is adjacent to the edge and is over, at least a part of the cavity. The apparatus includes an optically reflective coating on a portion of a wall of the cavity below the optical grating. The cavity has an opening along a portion of the edge of the planar structure.

15 Claims, 5 Drawing Sheets

(56) References Cited

U.S. PATENT DOCUMENTS

| | | | |
|---|---|---|---|
| 2013/0233824 A1 | 9/2013 | Doerr | |
| 2015/0086163 A1* | 3/2015 | Valera | G02B 6/0035 |
| | | | 385/37 |
| 2015/0214695 A1* | 7/2015 | Adachi | H01S 5/0267 |
| | | | 372/20 |
| 2016/0047990 A1 | 2/2016 | Zine-El-Abidine | |
| 2016/0370292 A1* | 12/2016 | Rothberg | C12Q 1/6874 |
| 2017/0207600 A1* | 7/2017 | Klamkin | H01S 5/0224 |

OTHER PUBLICATIONS

Zaoui, W. S. et al., "Cost-effective CMOS-compatible grating couplers with backside metal mirror and 69% coupling efficiency", Opt. Express, vol. 20, No. 26, pp. B238-B243, 2012.

Sodagar, M. et al., "High-efficiency and wideband interlayer grating couplers in multilayer Si/SiO2/SiN platform for 3D integration of optical functionalities", Opt. Express, vol. 22, No. 14, pp. 16767-16777, 2014.

Benedikovic, D. et al., "Subwavelength index engineered surface grating coupler with sub-decibel efficiency for 220-nm silicon-on-insulator waveguides", Opt. Express 23, No. 17, pp. 22628-22635, 2015.

* cited by examiner

OPTICAL GRATING COUPLER WITH BACK-SIDE REFLECTOR

BACKGROUND

Technical Field

The invention relates to optical devices and methods for making and using optical devices.

Related Art

This section introduces aspects that may be help to facilitate a better understanding of the inventions. Accordingly, the statements of this section are to be read in this light and are not to be understood as admissions about what is prior art or what is not prior art.

One type of optical coupler is an optical grating. An optical grating can be configured as a surface optical coupler that optically couples a near end of an optical fiber, which is facing the surface, to an optical waveguide, which extends along the surface. Often, such a configuration of an optical coupler is largely tolerant to the alignment between the near end of the optical fiber and the optical grating. Also, such a configuration of an optical coupler can be configured to substantially only couple to selected optical propagation mode(s) of the optical fiber.

Nevertheless, such an optical coupler often has high optical losses. For example, a substantial part of the light emitted by the near end of an optical fiber may pass through a thin optical grating and be lost. To reduce such losses, the back-sides of some optical gratings are coated with an optical reflector. Then, light passing through the optical grating may be reflected back to the optical grating, thereby increasing the efficiency of the optical coupling of the near end of the optical fiber to the optical grating.

Forming an optical reflector on the backside of an optical grating is typically a multi-step process. Some such processes include performing an anisotropic back-side etch of a planar substrate on whose front surface the optical grating is formed. The anisotropic back-side etch forms an opening in the planar substrate. The opening provides access so that an optical reflector can be deposited along a back-side of the optical grating. The formation of the opening in the back-side of a planar substrate may also include thinning the substrate to simplify the later anisotropic back-side etch of the substrate.

BRIEF SUMMARY OF SOME ILLUSTRATIVE EMBODIMENTS

Processes for anisotropic back-side etching and thinning of a planar substrate can be complex and/or costly. The processes can be complex and/or costly, because the starting optical structure is typically thick for reasons of structural support. Herein, various embodiments involve apparatus that include a planar optical structure with an optical grating coupler and an optical reflector located at a back-side of the optical grating coupler. Some processes for fabricating such apparatus may not require performing an anisotropic back-side etch and/or a thinning of the planar substrate on which the optical grating coupler is formed. Such processes may also leave deposited material of the optical reflector over a portion of the edge of the final planar substrate.

In first embodiments, an apparatus includes a planar structure, an optical grating, and an optically reflective coating. The planar structure has a top surface, a bottom surface, and an edge. The planar structure has a cavity, and a portion of the cavity is located between opposing portions of the top and bottom surfaces. The optical grating located near or at the top surface and has a regular pattern of features. The optical grating is adjacent to the edge and is over, at least a part of the cavity. The optically reflective coating is on a portion of a wall of the cavity below the optical grating. The cavity has an opening along a portion of the edge of the planar structure.

In some embodiments of the above apparatus, the optically reflective coating may cover a portion of the edge of the planar structure adjacent to the opening.

In some embodiments of the above apparatus, the optically reflective coating may cover a portion of an edge of the planar structure next to the top surface or may cover portions of the edge of the planar structure next to the top and bottom surfaces.

In some embodiments of the above apparatus, the planar structure may include a planar optical waveguide therein or thereon, and the optical grating may be configured to couple light into a nearby portion of the optical waveguide. In first types of such apparatus, the apparatus may further include an optical data receiver including the planar structure, and the optical grating may be capable of coupling light substantially vertically incident onto the planar structure into the planar optical waveguide. In some such embodiments, the apparatus may include an optical hybrid, which is located on or in the planar structure and is optically connected to the optical grating via the planar optical waveguide. In alternate second types of such apparatus, the apparatus may further an optical data transmitter including the planar structure. The optical grating may be configured for coupling light, which is substantially vertically incident onto the planar structure, into the planar optical waveguide. In some such embodiments, the optical data transmitter may further include an optical data modulator, which is located on or in the planar structure and is optically connected to the optical grating via the planar optical waveguide.

In any embodiments of the above apparatus, the optically reflective coating or coatings may be formed by one or more metal layers or by a dielectric multi-layer.

In any embodiments of the above apparatus, the planar structure may further include one of a vertical-cavity surface-emitting laser and a reflective semiconductor optical amplifier, wherein the optical grating forms an optical reflector of said one of a vertical-cavity surface-emitting laser and a reflective semiconductor optical amplifier. In other embodiments, the regular pattern of features of the optical grating may extend along the top surface.

In second embodiments, a method includes providing a planar structure having opposing top and bottom surfaces and forming a cavity into the planar structure. The forming is performed such that the cavity has an opening in at edge of the planar structure and opposing portions of the top and bottom surfaces are separated by an intervening portion of the cavity. The method also includes depositing a reflective material along a wall portion of the cavity via the opening at the edge of the planar structure. The method also includes providing an optical grating having a regular array of features near or at the top surface of the planar structure. A part of the deposited reflective material and a part of the cavity are located between the optical grating and the bottom surface of the planar structure.

In some embodiments of the above method, the wall portion may be separated from the bottom surface, in a direction normal to the bottom surface, by some of the cavity.

In some embodiments of the above method, the optical grating may be an optical coupler to a planar optical waveguide located on or in the planar structure.

In some embodiments of the above methods, the optical grating may be an optical coupler to an optical data modulator located on or in the planar structure. In other embodiments of the above methods, the optical grating may alternately be an optical coupler to an optical hybrid located on or in the planar structure.

In any embodiments of the above method, the deposited reflective material may be a metal or alternatively may form a multi-layer dielectric reflector.

Any embodiments of the above method may further include, in the planar structure, providing a vertical-cavity surface-emitting laser including the optical grating or a reflective semiconductor optical amplifier including the optical grating.

BRIEF DESCRIPTION OF THE DRAWINGS

In the Figures and text, like reference symbols indicate elements with similar or the same function and/or similar or the same structure.

In the Figures, relative dimension(s) of some feature(s) may be exaggerated to more clearly illustrate the feature(s) and/or relation(s) to other feature(s) therein.

Herein, various embodiments are described more fully by the Figures and the Detailed Description of Illustrative Embodiments. Nevertheless, the inventions may be embodied in various forms and are not limited to the embodiments described in the Figures and the Detailed Description of Illustrative Embodiments.

DETAILED DESCRIPTION OF ILLUSTRATIVE EMBODIMENTS

Various embodiments include an optical grating coupler located near or at a major surface of a planar substrate. Typically, the optical crating coupler is also located close to an edge of the planar substrate, and a metallic or multi-layer dielectric interference reflector is located behind the optical grating coupler and the major surface along a direction perpendicular to the major surface. Advantageously, some such embodiments can be fabricated without back-side etching or back-side thinning the original planar substrate.

Herein, planar structures and planar substrates have an overall planar form, but may or may not be entirely planar. For example, a planar structure or substrate may include a stack of layers on a major surface thereof, and one or more of the layers of the stack may be etched to form a surface relief. Also, such a planar structure or substrate may have one or more holes or cavities therein and/or there through.

Figure 1A:
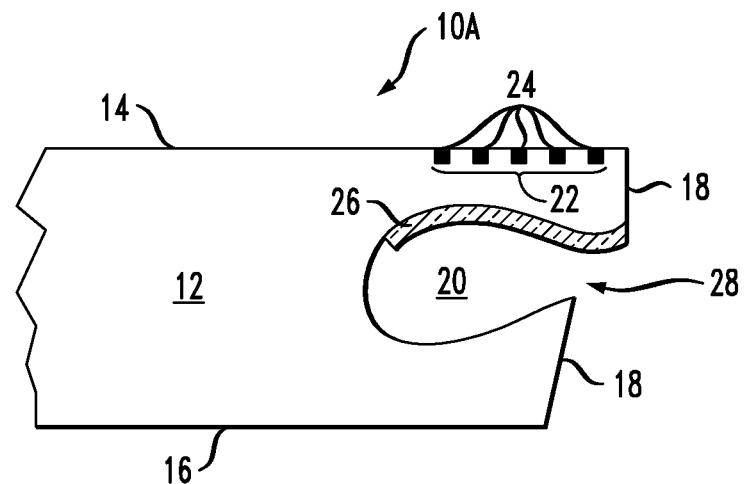
FIGS. 1A and 1B are cross-sectional views schematically illustrating alternative apparatus that include a planar structure with an optical grating therein.
Figure 1B:
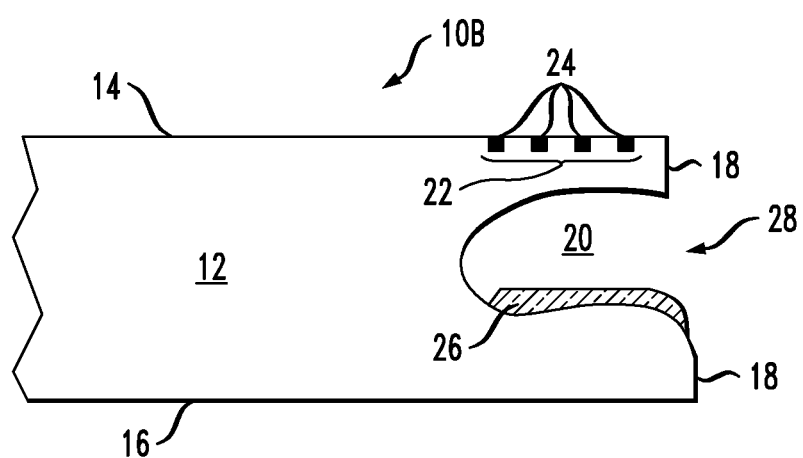

FIGS. 1A-1B illustrate first and second apparatus 10A, 10B that include a planar structure 12 and a cavity 20 therein. The planar structure 12 has a top surface 14, a bottom surface 16 opposing the top surface 14, and one or more edges 18.

Herein, top and bottom surfaces are major surfaces of a planar structure, and edges are minor surfaces of the same planar structure. A minor surface has one linear dimension that is substantially smaller than the linear dimensions of the major surfaces of the same planar structure, and a minor surface typically has a substantially smaller area than the major surfaces of the same planar structure. A person of ordinary skill in the relevant arts would readily recognize the top and bottom surfaces and edges of a planar structure or of a planar substrate.

In the planar structure 12, an optical grating 22 is located at or near the top surface 14. The optical grating 22 has a regular array of features 24 having a refractive index that differs from the refractive index of surrounding material of the planar structure 12. The features 24 may be, e.g., bumps or vias, respectively, and are located on or below the top surface 14. As an example, the features 24 may be localized physical regions, e.g., near and below the top surface 14, with a different refractive index than nearby portions of the planar structure 12. The optical grating 22 may be a phase grating, an amplitude grating, or a combination of an amplitude and phase grating. The features 24 may or may not be located in a multilayer (not shown) adjacent the top surface 14. The array of features 24 extends in one or two orthogonal directions along the top surface 14 and is regular and may even be periodic in the one or two directions. One side of the optical grating 22 is located near or at one of the one or more edges 18 of the planar structure 12.

Herein, a regular array has substantially similar features whose spacing is fixed or varies smoothly in one or two orthogonal directions. For example, the spacing between neighboring features may be constant or may vary linearly along the one or two orthogonal directions.

The optical grating 22 is located over, at least, a part of the cavity 20. With respect to the top surface 14, a portion of the cavity 20 is vertically below all or part of the optical grating 22, i.e., in a direction normal to the top surface 14. Also, at least, a portion of the cavity 20 is vertically located between opposing portions of the top and bottom surfaces 14, 16. The cavity 20 has an opening 28 along a portion of one of the one or more edges 18 of the planar structure 12. The cavity 20 may have been produced, e.g., without performing a back-side etch of the initial structure (not shown) for the planar structure 12.

The cavity 20 has an optically reflective coating 26 on a continuous or discontinuous wall portion thereof. The optically reflective coating 26 is capable of reflecting back some light, e.g., some of the light normally incident on the top surface 14. The optically reflective coating 26 is typically located to back-reflect light incident on the optical grating 22 in directions angularly close to a normal direction for the top surface 14. For that reason, some such back-reflected light is redirected towards the optical grating 22. The optically reflective coating 26 may be a conventional metal or metal alloy layer or multilayer or may be a dielectric multilayer whose refractive index variations cause reflection in a spectral range due to optical interference.

The edge-located opening 28 can be advantageous during fabrication of the planar structure 12. In particular, the opening 28 can be used to deposit the optically reflective coating 26 behind and near to the optical grating 22 without previously thinning or back-side etching the planar structure 12. As described below, the cavity 20 may be formed by performing a front-side etch of the initial form of the planar structure 12, and then, by cutting the planar structure 12 to form the one or more edges 18. The optically reflective coating 26 may be deposited in the cavity 20 via the opening 28, but such a deposition may also leave some material of the optically reflective coating 26 on the edge 18, i.e., outside of the cavity 20. The absence of a need for substrate thinning and/or back-side etching can make such a fabrication simpler and/or cheaper than fabrication processes used for making other apparatus (not shown) in which an optical grating coupler has a back-side reflector.

In the alternate embodiments of the apparatus 10A and 10B of FIGS. 1A and 1B, the optically reflective coating 26 is located on the wall portions of the cavity 20 that are respectively, nearer to and farther from the top surface 14 of the planar structure 12. The optically reflective coating 26 may also be located on both the wall portions of the cavity 20 nearest to the top surface 14 and the wall portions of the cavity 20 farthest from the top surface 14 (not shown). For all such embodiments, a portion of the optically reflective coating 26 is located vertically below the optical grating 22, i.e., below in a normal direction with respect to the top surface 14. Due to its location, the optically reflective coating 26 is able to reflect back to the optical grating 22 some of the light, which was normally incident on the top surface 14 and has passed through the optical grating 22. For this reason, the optically reflective coating 26 can improve the efficiency of the vertical coupling of light to the planar structure 12 via the optical grating 22. For example, the optical grating 22 can function as an improved vertical optical coupler for coupling light, which is normally incident onto the top surface 14, into a planar optical waveguide located along the top surface 16 (not shown).

The optically reflective coating 26 may optionally coat portion(s) of the edge 18 of the planar structure 12 next to the top surface 14, the bottom surface 16, or both the top and bottom surfaces 14, 16 (not shown in FIGS. 1A-1B). Such coating of portion(s) of the edge 18 of the planar structures 12 may result from the fabrication of the planar structures 12, e.g., due to an introduction material of the optically reflective coating 26 into the cavity 20 via the edge-located opening 28. Coating a portion of the edge 18 with material of the reflective coating 26 may also increase reflection of light back to the optical grating 22 thereby increasing the efficiency of the optical coupling of such light to the optical grating 22.

Figure 2A:
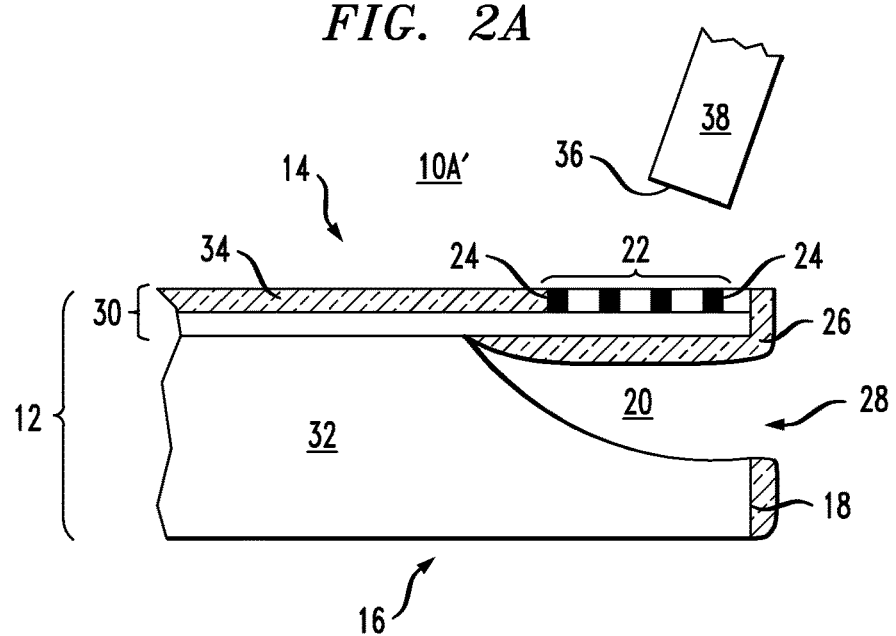
FIGS. 2A and 2B are cross-sectional views schematically illustrating multi-layer embodiments of the planar structures of FIGS. 1A and 1B, respectively.
Figure 2B:
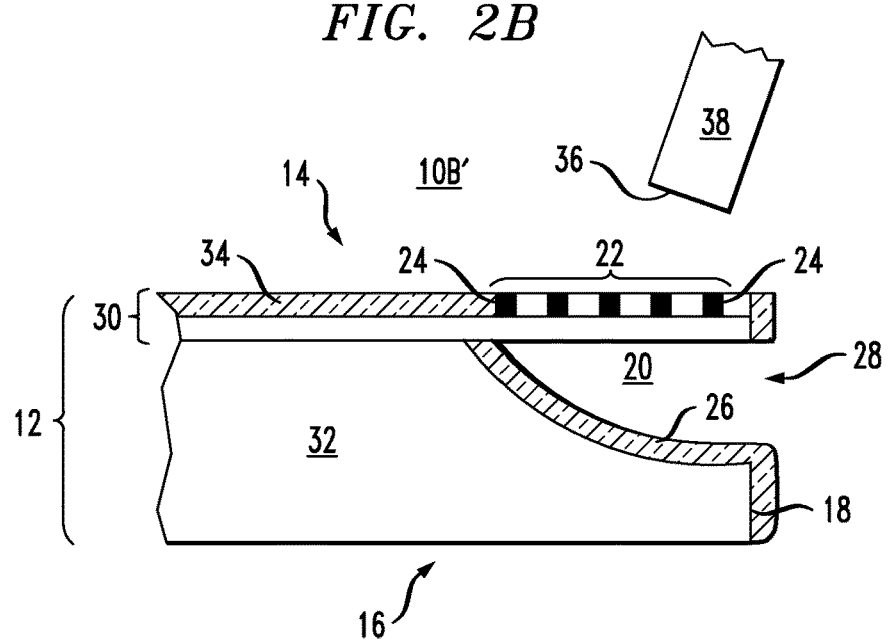

FIGS. 2A-2B illustrate specific embodiments 10A'-10B' of the apparatus 10A-10B illustrated in FIGS. 1A-1B. The apparatus 10A'-10B' include a planar substrate 32 and one or more layers 30 located directly on a major surface of thereof. The planar substrate 32 may be a conventional dielectric or semiconductor substrate, e.g., a silicon or III-V semiconductor substrate, formed by single-layer or formed by a stack of layers of different alloy compositions. The one or more layers 30 may include conventionally fabricated layer(s) of semiconductor and/or dielectric, e.g., dielectrics such as $SiO_2$, $Si_3N_4$ and/or semiconductors such as silicon or III-V semiconductor. For example, the planar structure 12 may formed from a commercially available silicon-oxide-silicon substrate.

In the apparatus 10A'-10B', the optical grating 22 and a planar optical waveguide 34 are located in the one or more layers 30. A near end of the planar optical waveguide 34 is adjacent to or abuts an edge or end of the optical grating 22. For that reason, the optical grating 22 can direct light, which is received, via free space, from an emission surface 36 of an external optical device 38, into the near end of the planar optical waveguide 34. The emission surface 36 of the optical device 38 may be above and facing, and, e.g., may be approximately parallel to, the top surface 14 of the planar structure 10A', 10B'.

For example, the emission surface 36 may be the near end of an optical fiber, an optical output of a laser, or an optical port of light emitter on another planar chip. Such optical devices 38 and emission surfaces 36 may be oriented and located to emit light substantially normally to the surface of the planar structure 12 so that the optical grating 22 can function as a vertical surface, optical coupler.

In other embodiments, the optical grating 22 may cause emission of light, into free space, above the planar structures 12, from the near end of the planar optical waveguide 34. For example, such vertical emission may optically couple the planar optical waveguide 34 to the near end 36 of an external optical fiber, to an optical input 36 of an external optical intensity detector, or to an optical input 36 on another planar chip. In the apparatus 10A', 10B', the cavity 20 is typically located in the planar substrate 32 under a lateral portion of the one or more layers 30. The lateral portion of the one or more layers 30 and an opposing portion of the planar substrate 32 may form portions of the wall of the cavity 20. The cavity 20 also has an opening 28 at the edge of the planar structure 12. The cavity 20 is, at least, partially filled by the optically reflective coating 26, e.g., located on the back-side of the one or more layers 30 and/or on a top surface of the planar substrate 32.

In the planar structure 10A' of FIG. 2A, both bottom and edge portions of the one or more layers 30 are covered by material of the optically reflective coating 26. The optically reflective coating 26 covers, at least, part of an area behind the optical grating 22. Thus, the optically reflective coating 22 can reflect back some light that has passed through the optical grating 22 and/or may reflect back some light that has arrived at the edge of the one or more layers 30. Such back-reflection may improve the efficiency of the optical grating 22 as a vertical optical coupler of the external optical device 38 to the planar optical waveguide 34. The optically reflective coating 26 may be a metal layer or multi-layer, e.g., of aluminum, copper, or silver or alloys and/or multi-layers thereof, or may be a multi-layer dielectric coating, which forms a wavelength-selective optical reflector.

In the planar structure 10B' of FIG. 2B, both top and edge portions of the planar substrate 32 are covered by material of the optically reflective coating 26. Again, the optically reflective coating 26 covers, at least, part of the area directly behind the optical grating 22. Thus, the optically reflective coating 26 can reflect back some light that has passed through the optical grating 22 thereby improving the efficiency of the optical grating 22 as a vertical optical coupler of the external optical device 38 to the planar optical waveguide 34. Again, the optically reflective coating 22 may be a metal layer or multi-layer, e.g., of aluminum, copper, or silver or alloys and/or multi-layers thereof, or may be a multi-layer dielectric coating, which forms a wavelength-selective optical reflector.

In the apparatus 10A', 10B' of FIGS. 2A and 2B, the material of the optically reflective coating 22 may, in some embodiments, cover edges of both the one or more layers 30 and the planar substrate 32 in an area adjacent to the opening 28 to the cavity 20. The presence of such material at such portions of such edges may be a result from use of advantageous processes for depositing said material in the cavity 20, as described in FIGS. 3-4.

In alternate embodiments, the features 24 of the optical grating 22 may form an array normal to the top surface 14 rather than parallel thereto as in FIGS. 2A-2B. In some such embodiments, the planar structure 12 may include a vertical-cavity surface-emitting laser (VCSEL) or a reflective semiconductor optical amplifier (RSOA), for which the optical grating 22 as a wavelength-selective optical reflector. In such embodiments, the optically reflective coating 26 may be an optical reflector of the VCSEL or RSOA.

Figure 3:
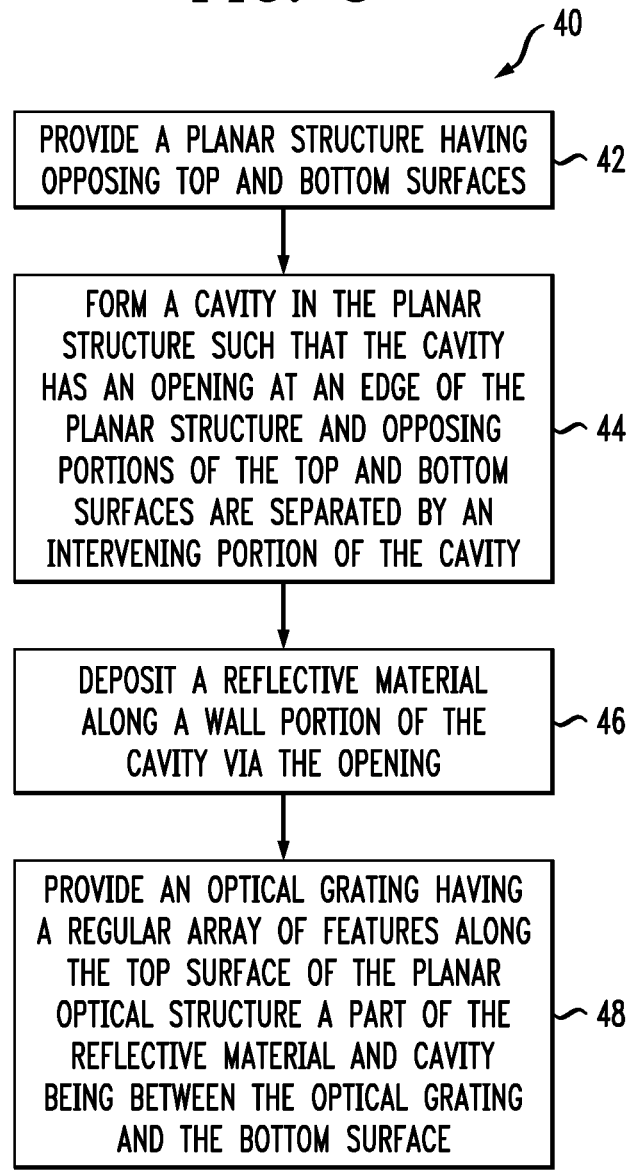
FIG. 3 illustrates a method of making an apparatus with an optical grating coupler, e.g., the apparatus of FIGS. 1A, 1B, 2A, and 2B.

FIG. 3 illustrates a method 40 of fabricating a planar structure having an optical grating therein, e.g., the planar structures 12 as shown in FIGS. 1A, 1B, 2A, and 2B.

The method 40 includes providing a planar structure having opposing top and bottom surfaces, i.e., opposing major surfaces (step 42). The planar structure may or may not have other features thereon, e.g., the stack of the one or more layers 30 on the planar substrate 32 as shown in FIGS. 2A-2B.

The method 40 includes forming a cavity in the planar structure such that the cavity has an opening at an edge of the planar structure and such that vertically opposing portions of the top and bottom surfaces are separated by an intervening portion of the cavity (step 44). The etch step 44 may include, e.g., performing a sequence of conventional top-side etches, e.g., dry and wet etches and may include, e.g., a separate step to form the opening such as cutting through the planar substrate and the cavity formed by the conventional top-side etches.

The method 40 includes, via the opening at the edge of the planar structure, depositing a reflective material, e.g., a metal layer or multi-layer or a dielectric multi-layer, along an interior wall portion of the cavity (step 46). For example the depositing step 46 may be performed by the opening 28 of FIGS. 1A, 1A, 2A, and 2B. The depositing step 46 may include, e.g., depositing on a portion of the wall separated from the bottom surface, in a direction normal to the top and bottom surfaces, by a part of the cavity.

The method 40 includes providing an optical grating, having a regular array of features, at or near the top surface of the planar optical structure (step 48). The method 40 is performed so that a part of the reflective material and a part of the cavity are located between the optical grating and the bottom surface of the planar structure. The providing step 48 may be performed prior to or after the forming step 44 and/or the depositing step 46. The optical grating may be, e.g., an optical coupler to a planar optical waveguide, an optical modulator, or an optical hybrid, located on or in the planar structure. Alternatively, the optical grating may be the partial or full light reflector of a VCSEL or RSOA in the planar structure, and the deposited reflective material may form a light reflector of the VCSEL or RSOA.

Figure 4:
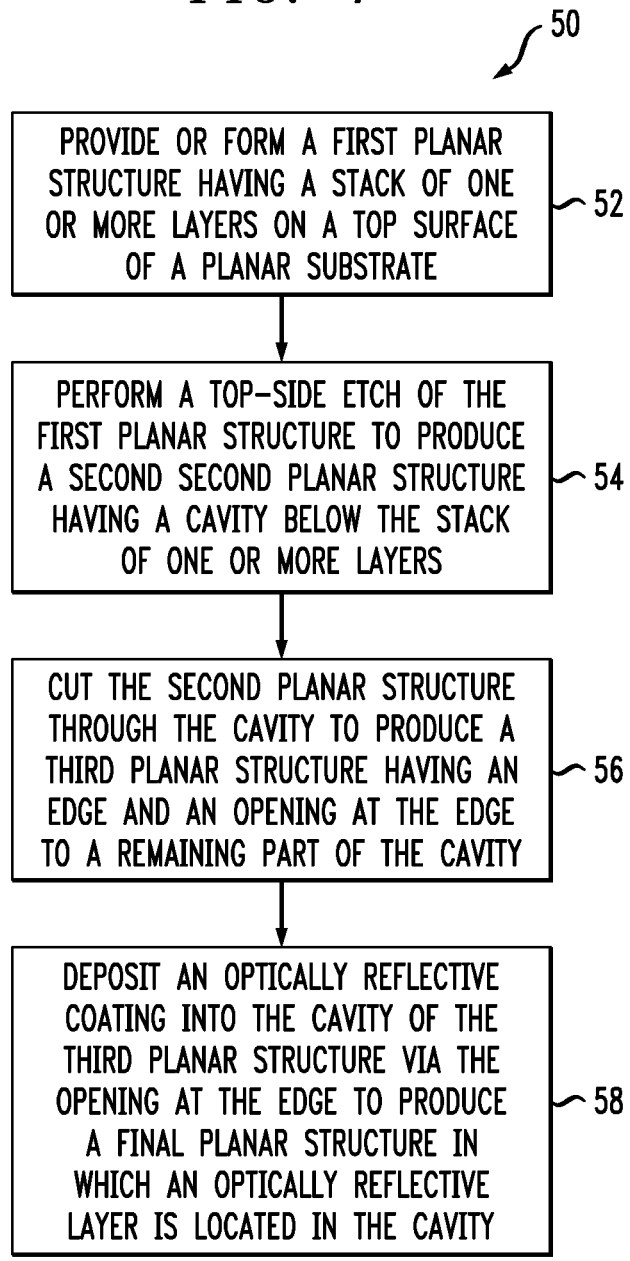
FIG. 4 illustrates an embodiment of the method of FIG. 3 for fabricating an apparatus with an optical grating coupler, e.g., the apparatus of FIGS. 2A and 2B.
Figure 5:
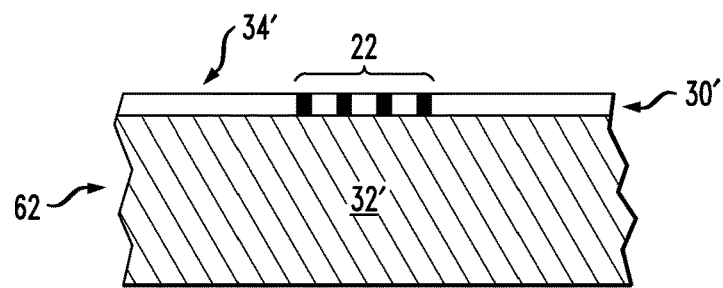
FIG. 5 illustrates intermediate and final structures of the fabrication method of FIG. 4.
Figure 5:
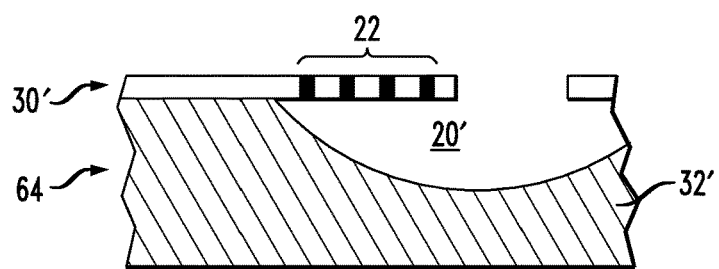
Figure 5:
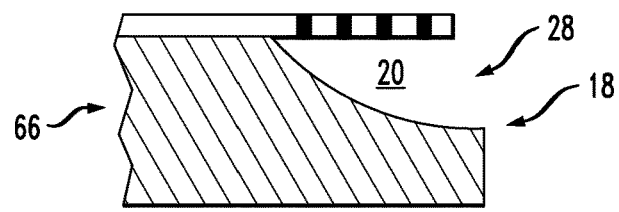
Figure 5:
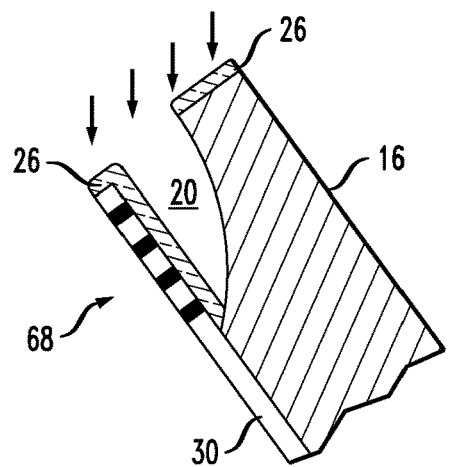

FIG. 4 illustrates a specific embodiment 50 of the method 40 of FIG. 3 of fabricating a planar structure with an optical grating. The method 50 produces intermediate and final planar structures 62, 64, 66, and 68, as illustrated in FIG. 5.

The method 50 includes providing or forming a first planar structure 62, which has a stack of one or more layers 30' on a top surface of a planar substrate 32' (step 52). For example, the providing or forming step 52 may provide or produce the one or more layers 30 on the planar substrate 32 as illustrated in FIGS. 2A and 2B. The providing or forming step 52 may also include forming or providing an optical grating, e.g., the optical grating 22 of FIGS. 2A and 2B, in the stack of one or more layers 30'.

The providing or forming step 52 may exploit various conventional processes to fabricate the stack of one or more layers 30' and/or the optical grating 22 therein or thereon. The optical grating 22 may be periodic or regular in one or two orthogonal directions. The optical grating 22 may couple at one or more lateral edges thereof to end(s) of planar optical waveguide(s) 34' in or on the single layer or multi-layer 30', e.g., the planar optical waveguide 34 shown in FIGS. 2A-2B.

The method 50 includes performing a top-side etch of the first planar structure 62 to produce a second planar structure 64 having a cavity 20' below the stack of one or more layers 30' and a hole through said stack of one or more layers o said cavity 20' (step 54). For example, the top-side etch may include a sequence of conventional etches. The sequence may include performing one or more anisotropic dry etches to form the hole through said stack of one or more layers 30' and then, performing, via the previously formed hole, an isotropic wet etch of material of the substrate 32' to undercut the stack of one or more layers 30'. For example, the isotropic etch may have a chemistry that selectively stops on material of the bottom layer(s) 30' of the stack so that the etched cavity 20 exposes the bottom side of the stack of one or more layers 30' below the optical grating 22.

The method 50 includes cutting the second planar structure 64 through the cavity 20 to split the second planar structure 64 thereby producing a third planar structure 66, which has an edge 18 and an opening 28, at the edge 18, to a remaining part 20 of the original cavity 20' (step 56). For example, the cutting step 56 may involve performing a conventional chip-dicing on the second planar structure 64 such that the original cavity 20' is broken into, at least, two parts.

The method 50 includes depositing an optically reflective coating 26 into the cavity 20 of the third planar structure 66 via the opening 28 at the edge 18, as illustrated by arrows in FIG. 5 (step 58). In FIG. 5, the edge-based deposition of material of the optically reflective coating 26 is schematically illustrated by arrows. The depositing step 58 produces the final planar structure 68, e.g., the planar structures 12 of FIGS. 2A-2B, in which material of the optically reflective coating is deposited on wall portion(s) of the cavity 20 (step 56). The depositing step 56 may use a convention process to deposit a metal single- or multi-layer or to deposit an optically reflective dielectric multi-layer. Such a process may deposit material of the optically reflective coating both on the interior wall(s) of the cavity 20 and on the edge 18 of the planar structure 66 adjacent to the opening 28. In the final planar structure 68, portions of the optically reflective coating 26 are located between part or all of the optical grating 22 and the bottom surface 16 of the final planar structure 68.

The Detailed Description of the Illustrative Embodiments and the drawings merely illustrate principles of the inventions. It will thus be appreciated that those skilled in the art will be able to devise various arrangements that, although not explicitly described or shown herein, embody the inventions and are included within the scope of the claims. Furthermore, all examples recited herein are principally intended to be only for pedagogical purposes to aid in understanding principles of the inventions and concepts contributed by the inventors to furthering the art, and are to be construed as being without limitation to such specifically recited examples and conditions. Moreover, all statements herein reciting principles, aspects, and embodiments of the inventions, as well as specific examples thereof, are intended to encompass equivalents thereof.

What is claimed is:

1. An apparatus, comprising:
 a planar structure having a top surface, a bottom surface, an edge, and a cavity, a portion of the cavity being vertically located between opposing portions of the top and bottom surfaces, a vertical direction being a direction orthogonal to the top surface;

an optical grating being located near or at the top surface, the optical grating being adjacent to the edge, being vertically over, at least a part of the cavity, and having a regular array of features extending along the top surface; and an optically reflective coating on a portion of a wall of the cavity located vertically below the optical grating to reflect light incident on the optical grating through the top surface back towards the optical grating; and wherein the cavity has an opening along a portion of the edge of the planar structure.

2. The apparatus of claim 1, wherein the optically reflective coating covers a portion of the edge of the planar structure adjacent to the opening.

3. The apparatus of claim 2, wherein the optically reflective coating is a metal layer.

4. The apparatus of claim 1, wherein the optically reflective coating is a metal layer.

5. The apparatus of claim 1, wherein a part of the optically reflective coating covers a portion of the edge next to the top surface.

6. The apparatus of claim 1, wherein a first part of the optically reflective coating covers a portion of the edge of the planar structure next to the top surface and a different second part of the optically reflective coating covers a portion of the edge of the planar structure next to the bottom surface.

7. The apparatus of claim 6, wherein the optically reflective coating is a metal layer.

8. The apparatus of claim 1,
wherein the planar structure includes a planar optical waveguide; and
wherein the optical grating is configured to couple light substantially vertically incident onto the top surface into a nearby portion of the planar optical waveguide.

9. The apparatus of claim 8, further including an optical data receiver, the optical data receiver including the planar structure.

10. The apparatus of claim 9, wherein the planar structure includes an optical hybrid optically connected to the optical grating via the planar optical waveguide.

11. The apparatus of claim 8, further including an optical data transmitter including the planar structure.

12. The apparatus of claim 11, wherein the planar structure further includes an optical data modulator optically connected to the optical grating via the planar optical waveguide.

13. The apparatus of claim 1, wherein the planar structure further comprises one of a vertical-cavity surface-emitting laser and a reflective semiconductor optical amplifier, and the optical grating forming an optical reflector of said one of a vertical-cavity surface-emitting laser and a reflective semiconductor optical amplifier.

14. An apparatus, comprising:
a planar structure having a top surface, a bottom surface, an edge, and a cavity, a portion of the cavity being vertically located between opposing portions of the top and bottom surfaces;

an optical grating being located near or at the top surface, the optical grating being adjacent to the edge and being over, at least a part of the cavity; and an optically reflective coating on a portion of a wall of the cavity below the optical grating;

wherein the cavity has an opening along a portion of the edge of the planar structure; and wherein a first part of the optically reflective coating covers a portion of the edge of the planar structure next to the top surface and a different second part of the optically reflective coating covers a portion of the edge of the planar structure next to the bottom surface.

15. The apparatus of claim 14, wherein the optically reflective coating is a metal layer.

* * * * *